(12) United States Patent
Barry et al.

(10) Patent No.: US 9,509,710 B1
(45) Date of Patent: Nov. 29, 2016

(54) ANALYZING REAL-TIME STREAMS OF TIME-SERIES DATA

(71) Applicant: International Business Machines Corporation, Armonk, NY (US)

(72) Inventors: Paul M. Barry, Cork (IE); Ian Manning, Passage West (IE); Natalia Udaltsova, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,027

(22) Filed: Nov. 24, 2015

(51) Int. Cl.
*G06F 11/00* (2006.01)
*H04L 29/06* (2006.01)
*G06F 17/30* (2006.01)

(52) U.S. Cl.
CPC ..... *H04L 63/1425* (2013.01); *G06F 17/30516* (2013.01)

(58) Field of Classification Search
CPC ........................................................ G06F 21/64
USPC ....................................................... 726/22–25
See application file for complete search history.

(56) References Cited

U.S. PATENT DOCUMENTS

| 3,908,118 | A | 9/1975 | Micka |
| 7,310,590 | B1 | 12/2007 | Bansal |
| 7,483,934 | B1 | 1/2009 | Ide et al. |
| 7,624,084 | B2 | 11/2009 | Chesla |
| 8,688,620 | B2 | 4/2014 | Viswanathan et al. |
| 8,738,652 | B2 | 5/2014 | Kramer |
| 8,924,333 | B2 | 12/2014 | Biem |
| 8,949,677 | B1 | 2/2015 | Brundage et al. |
| 2006/0293777 | A1 | 12/2006 | Breitgand et al. |
| 2007/0005256 | A1 | 1/2007 | Lincoln et al. |
| 2007/0180526 | A1* | 8/2007 | Copeland, III ..... H04L 63/1441 726/23 |
| 2007/0289013 | A1 | 12/2007 | Lim |
| 2007/0289017 | A1* | 12/2007 | Copeland, III ........ G06F 21/552 726/23 |
| 2008/0229415 | A1* | 9/2008 | Kapoor .................. G06F 21/55 726/22 |
| 2011/0119374 | A1 | 5/2011 | Ruhl et al. |

(Continued)

FOREIGN PATENT DOCUMENTS

| EP | 1724717 A2 | 11/2006 |
| WO | 0221800 A1 | 3/2002 |

(Continued)

OTHER PUBLICATIONS

Pukkawanna et al., "Network-based mimicry anomaly detection using divergence measures," Networks, Computers and Communications (ISNCC), 2015 International Symposium on Year: 2015 pp. 1-7.*

(Continued)

*Primary Examiner* — Roderick Tolentino
(74) *Attorney, Agent, or Firm* — Erik K. Johnson

(57) ABSTRACT

A computer-implemented method of analyzing a plurality of metrics associated with one or more real-time streams of time-series data. For each metric, a set of time-series data for an interval of time is received, and one or more feature values determined from data of the stream prior to the interval of time are retrieved. One or more updated feature values are determined using the one or more retrieved feature values and the received set of time-series data, and the one or more updated feature values are stored in the store. The values of the metrics are then determined from the updated feature values, the plurality of metrics are then analyzed, for example to perform anomaly detection.

6 Claims, 4 Drawing Sheets

(56) References Cited

U.S. PATENT DOCUMENTS

| | | |
|---|---|---|
| 2011/0154119 A1 | 6/2011 | Wang et al. |
| 2012/0197560 A1 | 8/2012 | Kuhns et al. |
| 2013/0055385 A1* | 2/2013 | Antony ............... G06F 21/577 726/22 |
| 2013/0338965 A1 | 12/2013 | Ide et al. |
| 2014/0108640 A1 | 4/2014 | Mathis |
| 2014/0201126 A1 | 7/2014 | Zadeh et al. |
| 2015/0135312 A1* | 5/2015 | Wada ................ G06F 11/3495 726/22 |
| 2016/0006753 A1* | 1/2016 | McDaid ............. H04L 63/1425 726/23 |
| 2016/0021124 A1* | 1/2016 | Sol .................... G06F 21/577 726/23 |
| 2016/0044054 A1* | 2/2016 | Stiansen ............ H04L 63/1416 726/24 |
| 2016/0065604 A1* | 3/2016 | Chen ................. H04L 63/1425 726/23 |

FOREIGN PATENT DOCUMENTS

| | | |
|---|---|---|
| WO | 2010111389 A2 | 9/2010 |
| WO | 2012103485 A2 | 8/2012 |

OTHER PUBLICATIONS

Solaimani et al., "Spark-based anomaly detection over multi-source VMware performance data in real-time," Computational Intelligence in Cyber Security (CICS), 2014 IEEE Symposium on Year: 2014 pp. 1-8.*

Cheboli, "Anomaly Detection of Time Series," A Thesis Submitted to the Faculty of the Graduate School of the University of Minnesota by Deepthi Cheboli, May 2010, pp. 1-83.

IBM Video, "What's New: Predictive Insights 1.3.2", available at: https://developer.ibm.com/itoa/videos/predictive-insights-1-3-2-whats-new/, published Jun. 23, 2015, printed on Nov. 23, 2015, pp. 1-2, Grace Period Disclosure.

IBM, Product Annoucement, "IBM Operation Analytics—Predictive Insights 1.3.2", available at https://developer.ibm.com/itoa/2015/06/30/ibm-operations-analytics-predictive-insights-1-3-2/, Annouced on Jun. 30, 2015, pp. 1-1 Grace Period Disclosure.

Wikipedia, "Feature Selection," Wikipedia, the free encyclopedia, https://en.wikipedia.org/wiki/Feature_selection, Printed on Nov. 24, 2015, pp. 1-10.

* cited by examiner

ANALYZING REAL-TIME STREAMS OF TIME-SERIES DATA

STATEMENT REGARDING PRIOR DISCLOSURES BY THE INVENTOR OR A JOINT INVENTOR

Aspects of the present invention have been disclosed by another, who obtained the subject matter disclosed directly from the inventors, in the product IBM Operations Analytics—Predictive Insights 1.3.2, made available to the public on Jun. 30, 2015. These aspects, as they may appear in the claims, may be subject to consideration under 35 U.S.C. §102(b)(1)(A).

BACKGROUND

The present invention relates to the analysis of real-time streams of time-series data.

Computer systems and applications are growing more complex and logging increasing amounts of data to allow for diagnostics and maintenance. The analysis of this data to find patterns and relationships grows exponentially more expensive as the size and complexity of the systems increase. For real-time systems, it may be desirable to analyze this data as fast as it is being collected, and with minimal delay.

It is often desirable to analyze large sets of time-series data, that is, data consisting of sets of values with associated times. Real-time analysis of time-series data as it is received is referred to as "streaming analytics." Such data may be generated, for example, by monitoring services for IT systems in which the values are details of error messages and the like, and telecommunications systems. A stream of data will have associated with it one or more "metrics," which are values that can be derived from the data stream. It may be desirable to perform correlation analyses of the data stream, referred to as "streaming correlation analysis," to determine if different metrics associated with the stream are correlated. In particular, for example, when the current metrics of two sets of time-series data now indicate a low level of correlation, when previously the metrics of the two sets of time-series data indicated a high level of correlation, this can be an anomalous situation that may indicate a problem.

The hardware requirements for such streaming analytics and streaming correlation analysis, using typical analytic techniques and approaches, requires memory and processing power that is far greater than that required to collect the data. A system that will identify patterns and relationships in streaming data, such that system operators can easily consume and act upon the information, would be advantageous. Further, it would be advantageous if such a system were implemented with a small memory and processing footprint.

BRIEF SUMMARY

In accordance with a first aspect of the invention there is provided a computer-implemented method of analyzing a plurality of metrics associated with one or more real-time streams of time-series data, comprising the steps of: for each metric, receiving a set of time-series data for an interval of time; for each metric, retrieving from a store one or more feature values determined from data of the stream prior to the interval of time; for each metric, determining one or more updated feature values using the one or more retrieved feature values and the received set of time-series data; for each metric, storing the one or more updated feature values in the store; and analyzing the plurality of determined metric values.

Conventional approaches for analyzing time-series data, for example to determine correlations or the like, require large data matrices to be kept and analyzed using mathematically expensive statistical methods, and are therefore hardware intensive. In contrast, with the above-described computer-implemented method only a set of features are stored for each metric is analyzed, rather than the full set of historical data for a stream, and so much less space is required in the store. Further, as the particular feature values that are determined and stored can be chosen to be those that represent aspects of the historical behavior of the stream, for example the mean of values in the stream so far. With a suitable set of feature values, the updated feature values can be determined from the retrieved feature values and the stream data for the interval of time, without the full historical stream data being required. In addition, as the calculations can be performed on the streamed data as it arrives, rather than on pre-existing batches of data, no buffering of data is required. This means the amount of calculation required is much less, and so is much less hardware intensive.

Advantageously, the one or more retrieved feature values for a metric in the store are replaced with the one or more updated feature values determined for the metric. This minimizes the amount of space in the store required, as historical feature values (i.e. feature values determined from data not including the most recent data) are not stored. However, as the feature values can be chosen so that they can be updated using only the retrieved feature value and the data for the interval, the updated feature values can still be determined.

Preferably, the one or more updated feature values determined for a metric are indicative of one or more of the mean, frequency, linear deviation or quantile of the data of the metric. It has been found that linear deviation provides useful results similar to those provided by standard deviation, while requiring much less calculation and so being less hardware intensive. It will be appreciated that the invention is generally applicable to metrics indicative of other statistical calculations which are conventionally performed on a batch of data (i.e. analyzing a full set of data to obtain the result for the set), where a version of the statistical calculation is available (or can be determined) that can be calculated from the data for the current interval and appropriate feature values for the data prior to the current interval.

Advantageously, the step of analyzing the one or more updated feature values determined for the plurality of metrics includes determining the correlation between two metrics of the plurality of metrics. Information about the correlation between metrics, in particular when previously correlated metrics become no longer correlated, can be of interest particularly when performing anomaly detection.

Preferably, the step of analyzing the one or more updated feature values determined for the plurality of metrics includes performing anomaly detection using one or more anomaly detection methods. The method is particularly suited to anomaly detection, though it will be appreciated that various other analyses could be performed.

Advantageously, the one or more anomaly detection methods include determining the correlation between one or more of the plurality of metrics and the average of the one or more of the plurality of metrics. By determining the correlation between metrics and an average of the metrics, rather than between each other, the calculations required are significantly reduced.

Advantageously, the analysis of the plurality of determined metric values comprises the steps of: separating the plurality of metrics into one or more groups of metrics with values within a predetermined range; for each of the one or more groups of metrics, further separating the metrics into one or more subgroups of correlated metrics; and performing anomaly detection on each subgroup of correlated metrics. This provides a particularly efficient method for performing anomaly detection, while still obtaining good results. Preferably, the step of separating the plurality of metrics into one or more groups of metrics includes discarding a metric with a value outside of a predetermined range.

In accordance with a second aspect of the invention there is provided a computer system arranged to receive one or more real-time streams of time-series data, the one or more streams having associated with them a plurality of metrics, the computing system comprising: one or more processors arranged to analyze the data of the one or more streams; memory for storing, for each metric, one or more feature values determined from the data of the stream with which the metric is associated; wherein the computing system is arranged, for each metric, to: receive a set of time-series data for an interval of time; retrieve from the memory one or more feature values determined from data of the stream prior to the interval of time; determine one or more updated feature values using the one or more retrieved feature values and the received set of time-series data; store the one or more updated feature values in the memory; and wherein the computing system is further arranged to analyze the plurality of determined metric values.

Advantageously, the computer system is arranged to replace the one or more retrieved feature values for a metric in the store with the one or more updated feature values determined for the metric.

Preferably, the one or more updated feature values determined for a metric are indicative of one or more of the mean, frequency, linear deviation or quantile of the data of the metric.

Advantageously, the computer system is arranged to analyze the one or more updated feature values determined for the plurality of metrics by determining the correlation between metrics.

Preferably, the computer system is arranged to analyze the one or more updated feature values for the plurality of metrics by performing anomaly detection using one or more anomaly detection methods.

Advantageously, the one or more anomaly detection methods include determining the correlation between one or more of the plurality of metrics and the average of the one or more of the plurality of metrics.

Advantageously, the computer system is further arranged to analyze the plurality of determined metric values by: separating the plurality of metrics into one or more groups of metrics with values within a predetermined range; for each of the one or more groups of metrics, further separating the metrics into one or more subgroups of correlated metrics; and performing anomaly detection on each subgroup of correlated metrics. Preferably, the computer system is arranged, when separating the plurality of metrics into one or more groups of metrics, to discard a metric with a value outside of a predetermined range.

In accordance with a third aspect of the invention there is provided a computer program product for analyzing metrics of one or more a plurality of real-time streams of time-series data, the computer program product comprising a computer-readable storage medium having computer-readable program code embodied therewith, the computer-readable program code configured to perform any of the methods described above.

In accordance with a fourth aspect of the invention there is provided a computer program product for analyzing metrics of one or more a plurality of real-time streams of time-series data, the computer program product comprising a computer-readable storage medium having computer-readable program code embodied therewith, the computer-readable program code configured when executed on a computer system to provide any of the computer systems described above.

It will of course be appreciated that feature values described in relation to one aspect of the present invention may be incorporated into other aspects of the present invention. For example, the method of the invention may incorporate any of the feature values described with reference to the computer system of the invention and vice versa.

BRIEF DESCRIPTION OF THE DRAWINGS

Preferred embodiments of the present invention will now be described, by way of example only, with reference to the following drawings in which.

DETAILED DESCRIPTION

It is often desirable to analyze large sets of time-series data, i.e. data consisting of sets of values with associated times. This is often referred to as "streaming analytics", i.e. analysis of a stream of data received in real-time. Such data is generated by monitoring services for IT systems (in which the values are details of error messages and the like, for example) and telecommunications systems, for example. A stream of data will have associated with it one or more "metrics", which are values derivable from the data of the stream. It can be desirable to perform correlation analysis to determine if different metrics are correlated ("streaming correlation analysis"), for example. In particular, when the metrics of two sets of time-series data are historically correlated but stop being correlated, this is an anomalous situation that can be of interest.

Conventional approaches for determining such correlations (and other analyses) require large data matrices to be kept and analyzed using mathematically expensive statistical methods, and are therefore hardware intensive. It would be advantageous to be able to perform analyses that provide similar results, but without such high hardware requirements.

Figure 1:
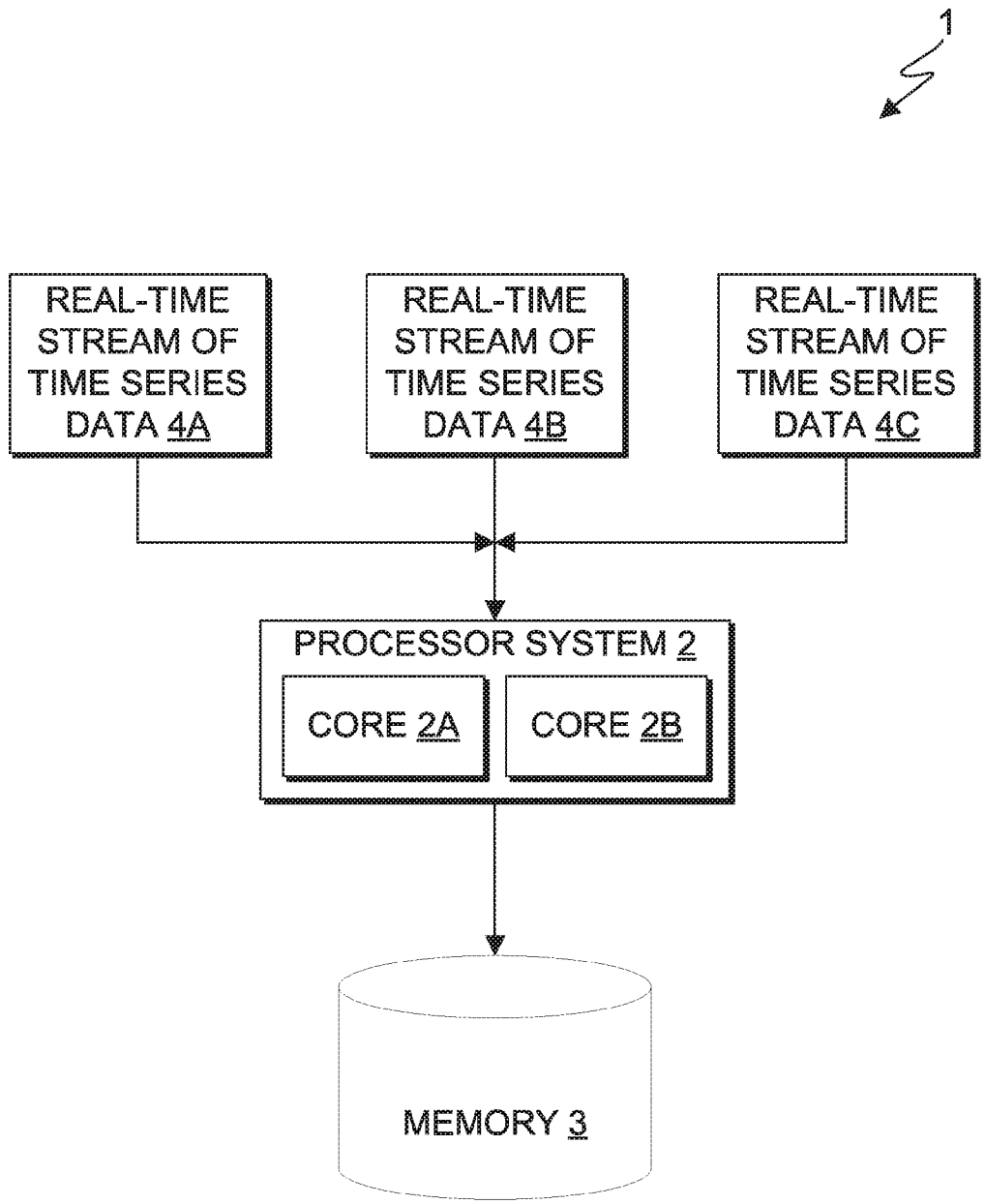
FIG. 1 shows a computer system in accordance with an embodiment of the invention.

A computer system in accordance with an embodiment of the invention is shown in FIG. 1. The computer system 1 comprises a processor system 2, which comprises processor cores 2a and 2b. The processor system 2 is in communication with memory 3, such that it can store data in, and retrieved stored data from, the memory 3. The processor system 2 receives real-time streams of time-series data 4a, 4b and 4c.

The streams of data 4a, 4b, 4c may be received from other computer systems, and/or may be generated within the computer system 1 itself. For example, the streams 4a may be generated by a monitoring service running on the computer system 1, that monitors the operation of a hardware or software system of the computer system 1 such as a hard disk, database, or a user application. In this case, the data of the stream 4a will include details of error messages generated by the monitored system and captured by the monitoring service, for example, including details of time when the error occurred, thus providing a real-time stream of time-series data. Each stream 4a, 4b, 4c will have associated with it one or more metrics, derivable from the data of the stream of the metric.

For each metric of each stream 4a, 4b, 4c, the computer system 1 uses the data of the stream to determine a plurality of feature values, which are stored in the memory 3. The feature values of a metric represent various properties of the data of the stream from which the metric is derived. For example, the feature values determined for a metric may include feature values representing the mean, frequency, linear deviation and quantile of the data of the stream of the metric, amongst other things.

Figure 2:
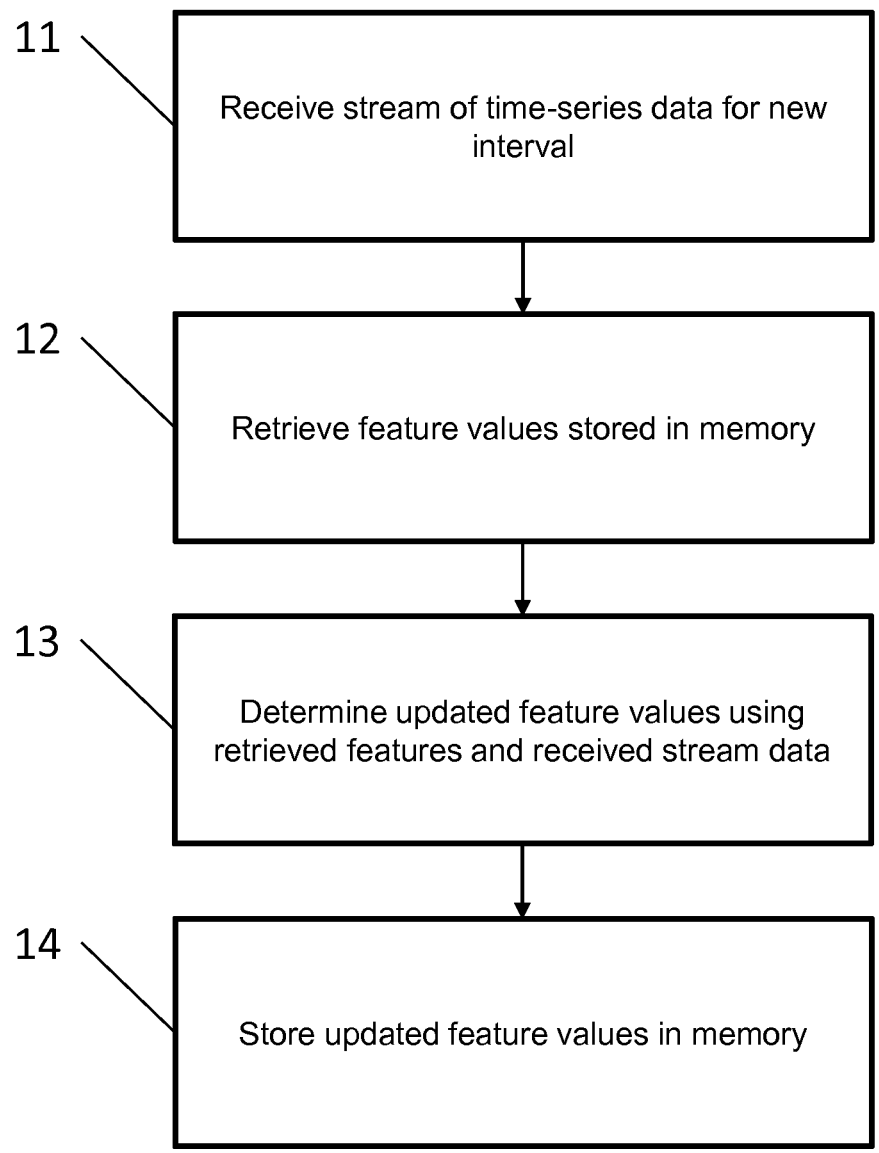
FIG. 2 is a flowchart showing the operation of the computer system when determining the feature values for a stream.

The determination of the feature values is now described in detail with reference to the flowchart of FIG. 2. The processor 2 receives the streams 4a, 4b, 4c of time-series data in real time, i.e. as the data they contain is generated. The computer system 1 uses the real-time data of the streams 4a, 4b, 4c to produce the plurality of feature values for the metrics of the streams 4a, 4b, 4c at given intervals. The length of an interval will depend upon the amount of data that is being received, which will depend on the number of metrics and the granularity of the data (i.e. how frequently data values occur in a stream). If there are 10 metrics then an interval might be every 5 seconds, for example, whereas for 250,000 metrics an interval might be 5 minutes. In the present example, it is assumed that the feature values are being determined for a metric of the stream 4a.

In a first step, the processor system 2 receives the time-series data for the stream 4a for the new interval (step 11), i.e. the data since the end of the immediately preceding interval. The processor system 2 also retrieves the feature values for the metric of the stream 4a that are currently stored in the memory 3 (step 12). (These will be the feature values determined for the metric for the immediately preceding interval.)

The processor system 2 then uses the data for the new interval and the retrieved feature values to determine updated feature values for the metric for the new interval (step 13). In particular, the updated feature values for the metric "for the new interval" are the feature values for the metric for the time period up to the new interval, i.e. including the new interval and all preceding intervals. The calculation of the updated feature values is described in more detail below. The updated feature values are then stored in the memory 3 (step 14). Preferably the updated feature values overwrite the retrieved feature values in the memory 3 (i.e. historical feature values are not retained in the memory 3), to minimize the amount of storage space required in the memory 3.

The computer system 1 then repeats the steps at the next interval on the data received for that interval (step 11 again), so that the feature values are updated for the next interval.

The determination of the updated feature values from the data for the new interval and the retrieved feature values is now described, for various exemplary feature values.

Where a feature value is the time period over which stream data has been received, the updated feature value is determined by adding the interval period to the retrieved feature value. For example, if the retrieved feature value is 1025 seconds, and the interval period is 5 seconds, the updated feature value is 1025+5=1030 seconds. Similarly, where a feature value is the number of intervals for which stream data has been received, the updated feature value is obtained simply by incrementing the retrieved feature value.

Where a feature value represents the mean of values in the stream, conventionally the mean µ is calculated using the following equation:

$$\mu = \frac{1}{N}\sum x_i$$

for the full set of values $x_i$ received over the N intervals. In accordance with the present invention, the "streaming mean" $\mu_{n-1}$ can be calculated using the following equation:

$$\mu_{n+1} = \mu_n + \frac{(x_{n+1} - \mu_n)}{(n+1)}.$$

As can be seen, this calculation requires only the streaming mean $\mu_n$ for the preceding interval, the value $x_{n+1}$ for the new interval, and the number of intervals n, and requires significantly fewer calculation steps.

Similarly, where a feature value represents the average mean deviation of values in the stream, conventionally the average mean deviation d is calculated using the following equation:

$$d = \frac{1}{N}\sum |x_i - \mu|$$

In accordance with the present embodiment, the "streaming average mean deviation" $d_{n+1}$ can be calculated using the following equation:

$$d_{n+1} = d_n + \frac{(|x_{n+1} - \mu_n| - d_n)}{(n+1)}.$$

It will be appreciated that feature values representing various other properties of a stream can be calculated and stored.

For each interval, once the updated feature values have been determined for each metric, the value of the metrics themselves can be obtained from the updated feature values. The value of a metric may simply be a selected feature value that is useful for analysis. For example, comparing the streaming average mean deviation of different streams can provide useful information, and so the feature value representing this may be a metric. In contrast, the feature value of the number of intervals is used when determining the updated feature values, but is not useful for analysis itself. The values of other metrics may be obtained by combining feature values for a stream.

The metrics can then be analyzed as appropriate, for example by one or more anomaly detection methods in order to detect anomalies. It will be appreciated, however, that many other types of analysis could be performed using the metrics.

Figure 3:
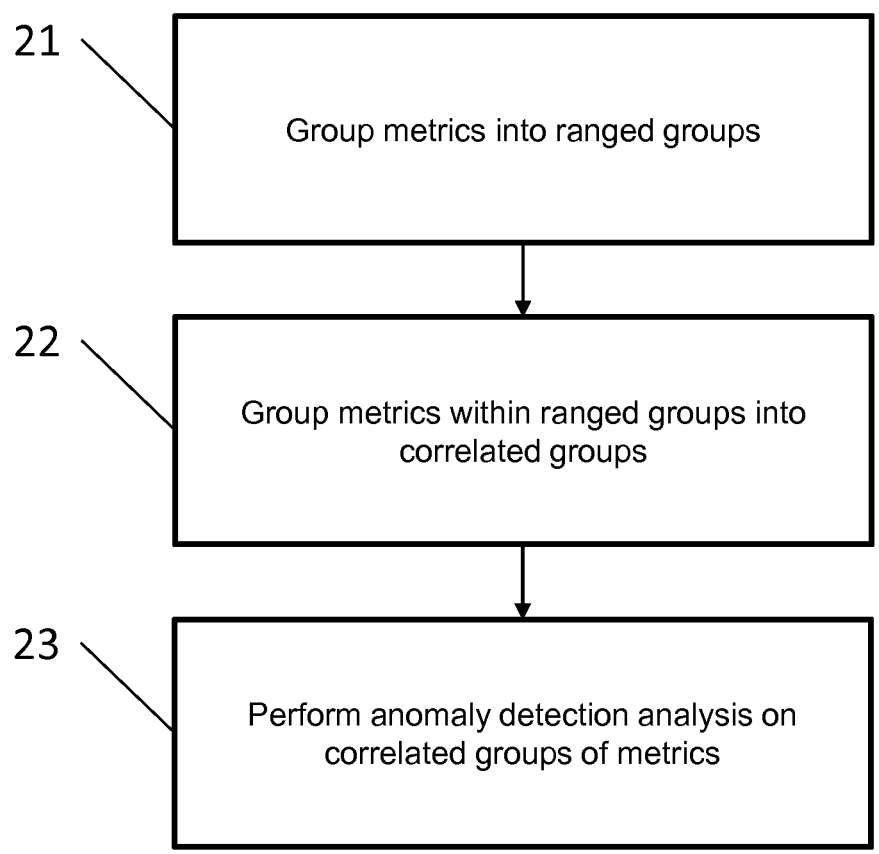
FIG. 3 is a flowchart showing the operation of the computer system when analyzing the feature values determined for the streams.

An example of analysis of the metrics to perform anomaly detection is now described with reference to the flowchart of FIG. 3. In a first step, the metrics for the streams are grouped together using ranges (step 21), i.e. metric values that are sufficiently close are in value are put into the same group. With a set of 100 metrics, this might for example result in a first group of 20 metrics, a second group of 30 metrics, and the remaining 50 metric being deemed as unsuitable (ether due to the metric value or its underlying feature values) and so not undergoing any further analysis.

The metrics in each group are further separated into groups of correlated metrics, using a known method of correlation approximation (step 22). In the given example, this might lead to the group of 20 metrics being subdivided into groups of 10, 3 and 3 correlated metrics, with 4 metrics not being correlated with any other metrics and so not undergoing any further analysis. Similarly, the group of 30 metrics might be subdivided into groups of 15 and 5 correlated metrics.

Anomaly detection is then performed on each of the correlated groups of metrics (step 23), by comparing the metrics to the average of the group.

In this way, the amount of calculation required is much less than in conventional approaches, as at each stage the amount of data that needs to be considered or the amount of comparisons that need to be performed are reduced, this allowing high volumes of data to be effectively analyzed and anomalies detected quickly and cheaply.

Figure 4:
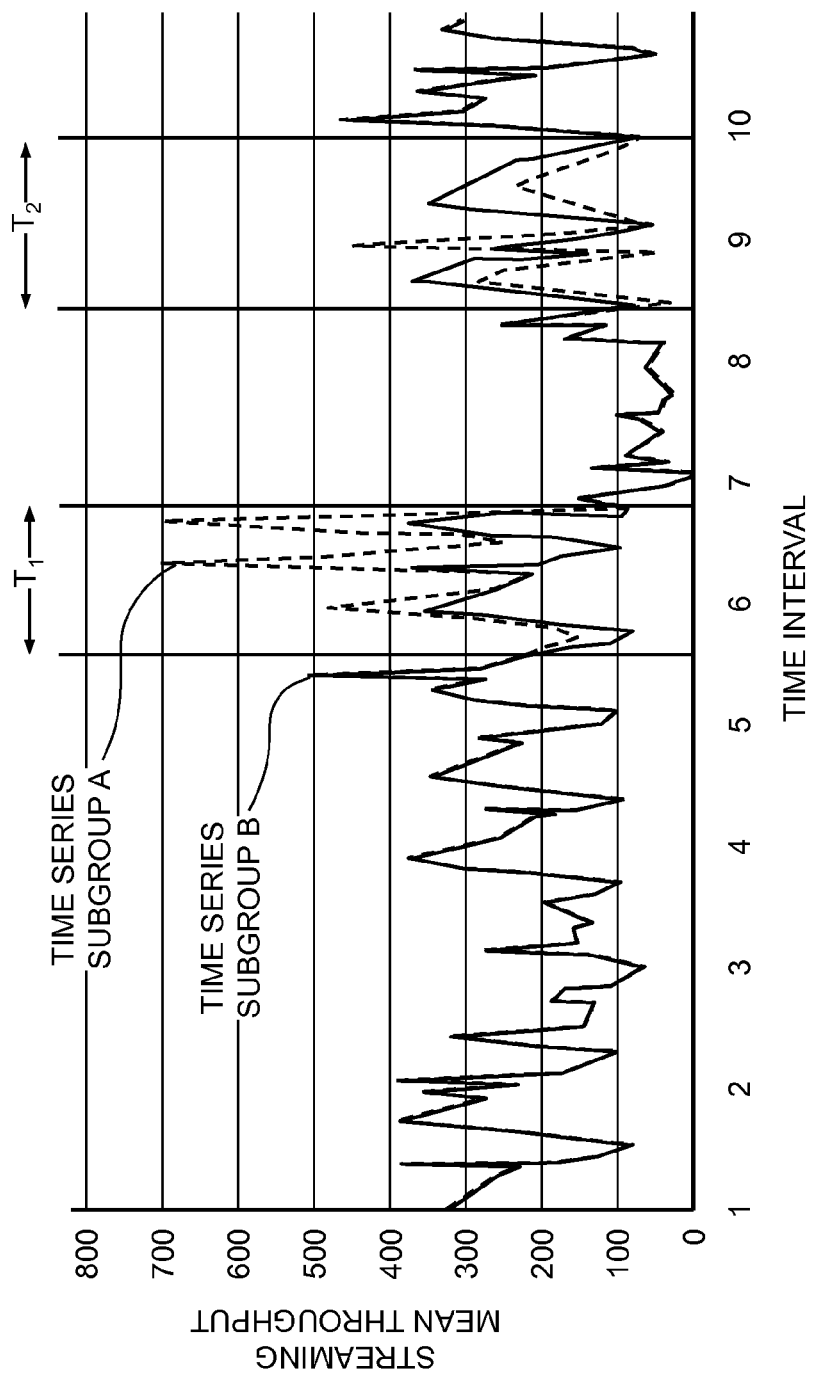
FIG. 4 illustrates an example application of an embodiment of the invention.

FIG. 4 illustrates an example application of an embodiment of the invention. Real-time streams of data 4a, 4b, and 4c are received by computer system 1. For Example, the real-time data streams may be received from multiple routing components in a network to which computer system 1 is connected. The data from each routing component may include, for example, various performance statistics, or metrics, such as packet size, throughput, queue depth, packet delay, etc. In the example, the metric of interest is router throughput as measured, for example, by packets per second. This metric is extracted from the real-time data streams, and a feature value, for example, streaming mean throughput, is determined over a moving interval for each of the real-time data streams, as described above. A correlation analysis is performed on this feature value over all the real-time data streams, and it may be determined that a group of the real-time data streams is correlated above a threshold degree. FIG. 4 illustrates this as a Mean Throughput Correlation Graph Group, showing a data trace for the group of correlated data streams indicating the streaming mean throughput as a function of time interval.

As indicated, all data streams initially identified as correlated, with respect to streaming mean throughput, continue to show a high degree of correlation up to about time interval 5.5. At time interval 5.5, and lasting for a duration of $T_1$, a portion of the real-time data streams, indicated as Time Series Subgroup A, diverge, with respect to their streaming mean throughput, from the other real-time data streams, indicated as Time Series Subgroup B. In this example, the real-time data streams within each subgroup remain correlated. After interval $T_1$, the real-time data streams of Time Series Subgroup A and Time Series Subgroup A return to a high degree of correlation with respect to streaming mean throughput. Similarly, during interval $T_2$, Time Series Subgroup A and Time Series Subgroup B diverge with respect to their streaming mean throughput correlation.

A certain period of time into intervals $T_1$ and $T_2$, as the two time series subgroups diverge with respect to their streaming mean throughput correlation, anomaly detection methods, as described above, would identify these divergences as anomalies, based, for example, on the degree of divergence correlation of the correlation between the subgroups. In certain embodiments, detection of such anomalies will trigger an alert by computer system 1, such as a screen message, a text notification, etc.

In this example, the anomalies detected for intervals T1 and T2 may indicate adverse network conditions at the routing components corresponding to the real-time data streams of time series subgroup A, such as, for example, a sudden spike in network traffic, network hardware outages, etc. In response to the alert, network routing tables, for example, may be modified alleviate the issue.

It will be appreciated that the invention could be implemented as a stand-alone application or system that received incoming streams of real-time data, or as additional functionality or module for an existing analysis application or monitoring system or the like. The processing system described above could be a single processer of a computer system, or the processing steps could be distributed across multiple processors of a single computer system or of multiple computer systems, for example.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:
1. A method for analyzing, in real-time, a plurality of data streams including time-series data, the method comprising:
receiving, by a first computer connected to a second computer, a first data stream of the plurality of data streams, including time-series data and one or more metrics, for a first time interval, wherein the time-series data is generated by a monitoring service operating on the second computer configured to monitor operations performed by hardware and software components of one or more other computers, including at least the first computer, and wherein each of the one or more metrics is a performance statistic of the monitored operations;
responsive to receiving the time-series data at the first computer, retrieving, by the first computer from a computer readable storage medium, one or more feature values for each of the one or more metrics, wherein the one or more feature values were previously produced during a time interval immediately preceding the first time interval, including a streaming mean for the preceding time interval $\mu_n$;
producing, by the first computer, for each of the one or more metrics, one or more updated feature values including a streaming mean for the first time interval $\mu_{n+1}$, based on the received time-series data $x_{n+1}$, the retrieved streaming mean $\mu_n$, and a number of time intervals n preceding the first time interval n+1, at least according to the relationship:

$$\mu_{n+1} = \mu_n + \frac{(x_{n+1} - \mu_n)}{(n+1)};$$

storing, by the first computer, for each of the one or more metrics, the one or more updated feature values including the produced streaming mean $\mu_{n+1}$ in the computer readable storage medium by overwriting the one or more retrieved feature values;

determining, by the first computer, a value for each of the one or more metrics, based on the one or more updated feature values including the streaming mean $\mu_{n+1}$;

responsive to determining the value for each of the one or more metrics, grouping, by the first computer, each of the one or more metrics into a plurality of groups, wherein each group of the plurality of groups includes the one or more metrics having values within a specified range;

for each group of the plurality of groups:

calculating, by the first computer, an average value, based on the values of the one or more metrics included in a respective group;

identifying, by the first computer, a subgroup of correlated metrics, based on a correlation approximation for values of the one or more metrics included in the respective group;

comparing, by the first computer, the values of the one or more correlated metrics included in the subgroup with the average value of the respective group;

determining, by the first computer, whether the value of one of the one or more correlated metrics included in the subgroup diverge from the average value of the respective group above a correlated threshold, wherein a divergence from the average value of the respective group above the correlated threshold indicates one or more operational anomalies performed by the hardware and the software components; and transmitting, by the first computer, a notification including information for the one or more operational anomalies to the second computer.

2. The method of claim 1, wherein the one or more updated feature values for each of the one or more metrics include one or more of: a mean, a frequency, a linear deviation, or a quantile.

3. The method of claim 1, further comprising:

receiving, by a first computer connected to a second computer, a second data stream of the plurality of data streams, including time-series data and one or more metrics, for a first time interval, wherein the time-series data is generated by a monitoring service operating on the second computer configured to monitor operations performed by hardware and software components of one or more other computers, including at least the first computer, and wherein each of the one or more metrics is a performance statistic of the monitored operations;

for the second data stream:

responsive to receiving the time-series data at the first computer, retrieving, by the first computer from a computer readable storage medium, one or more feature values for each of the one or more metrics, wherein the one or more feature values were previously produced during a time interval immediately preceding the first time interval, including a streaming mean for the preceding time interval $\mu_n$;

producing, by the first computer, for each of the one or more metrics, one or more updated feature values including a streaming mean for the first time interval $\mu_{n+1}$, based on the received time-series data $x_{n+1}$, the retrieved streaming mean $\mu_n$, and a number of time intervals n preceding the first time interval n+1, at least according to the relationship:

$$\mu_{n+1} = \mu_n + \frac{(x_{n+1} - \mu_n)}{(n+1)};$$

storing, by the first computer, for each of the one or more metrics, the one or more updated feature values including the produced streaming mean $\mu_{n+1}$ in the computer readable storage medium by overwriting the one or more retrieved feature values;

determining, by the first computer, a value for each of the one or more metrics, based on the one or more updated feature values including the streaming mean $\mu_{n+1}$;

responsive to determining the value for each of the one or more metrics, grouping, by the first computer, each of the one or more metrics from the first data stream and from the second data stream into a plurality of groups, wherein each group of the plurality of groups includes the one or more metrics having values within a specified range;

for each group of the plurality of groups, wherein each group includes the one or more metrics from the first data stream and from the one or more metrics from second data stream:

calculating, by the first computer, an average value, based on the values of the one or more metrics included in a respective group;

identifying, by the first computer, a subgroup of correlated metrics, based on a correlation approximation for values of the one or more metrics included in the respective group;

comparing, by the first computer, the values of the one or more correlated metrics included in the subgroup with the average value of the respective group;

determining, by the first computer, whether the value of one of the one or more correlated metrics included in the subgroup diverge from the average value of the respective group above a correlated threshold, wherein a divergence from the average value of the respective group above the correlated threshold indicates one or more operational anomalies performed by the hardware and the software components; and transmitting, by the first computer, a notification including information for the one or more operational anomalies to the second computer.

4. A computer system for analyzing, in real-time, a plurality of data streams including time-series data, the computer comprising:

one or more computer processors;

one or more computer readable storage media;

program instructions stored on the one or more computer readable storage media for execution by at least one of the one or more processors, the program instructions comprising:

program instructions to receive a first data stream of the plurality of data streams, including time-series data and one or more metrics, for a first time interval, wherein the time-series data is generated by a monitoring service operating on a second computer configured to monitor operations performed by hardware and software components of one or more other computers, including at least the computer system, and wherein each of the one or more metrics is a performance statistic of the monitored operations;

program instructions to, responsive to receiving the time-series data at the computer system, retrieving one or more feature values for each of the one or more metrics, wherein the one or more feature values were previously produced during a time interval immediately preceding the first time interval, including a streaming mean for the preceding time interval $\mu_n$;

program instructions to produce for each of the one or more metrics, one or more updated feature values including a streaming mean for the first time interval $\mu_{n+1}$, based on the received time-series data $x_{n+1}$, the retrieved streaming mean $\mu_n$, and a number of time intervals n preceding the first time interval n+1, at least according to the relationship:

$$\mu_{n+1} = \mu_n + \frac{(x_{n+1} - \mu_n)}{(n+1)};$$

program instructions to store, for each of the one or more metrics, the one or more updated feature values including the produced streaming mean $\mu_{n+1}$ in the computer readable storage medium by overwriting the one or more retrieved feature values;

program instructions to determine a value for each of the one or more metrics, based on the one or more updated feature values including the streaming mean $\mu_{n+1}$;

program instructions to, responsive to determining the value for each of the one or more metrics, group each of the one or more metrics into a plurality of groups, wherein each group of the plurality of groups includes the one or more metrics having values within a specified range;

for each group of the plurality of groups:

program instructions to calculate an average value, based on the values of the one or more metrics included in a respective group;

program instructions to identify a subgroup of correlated metrics, based on a correlation approximation for values of the one or more metrics included in the respective group;

program instructions to compare the values of the one or more correlated metrics included in the subgroup with the average value of the respective group;

program instructions to determine whether the value of one of the one or more correlated metrics included in the subgroup diverge from the average value of the respective group above a correlated threshold, wherein a divergence from the average value of the respective group above the correlated threshold indicates one or more operational anomalies performed by the hardware and the software components; and program instructions to transmit a notification including information for the one or more operational anomalies to the second computer.

5. The computer system of claim 4, wherein the one or more updated feature values for each of the one or more metrics are include one or more of: a mean, a frequency, a linear deviation, or a quantile.

6. The computer system of claim 4, wherein the program instructions stored on the one or more computer readable storage media further comprise:

program instructions to, responsive to determining that the values for the one or more metrics are not within the specified range, discard the one or more metrics not within the specified range.

\* \* \* \* \*